April 10, 1934.   C. STANSBURY   1,954,028
CURRENT REGULATING SYSTEM
Filed May 31, 1930
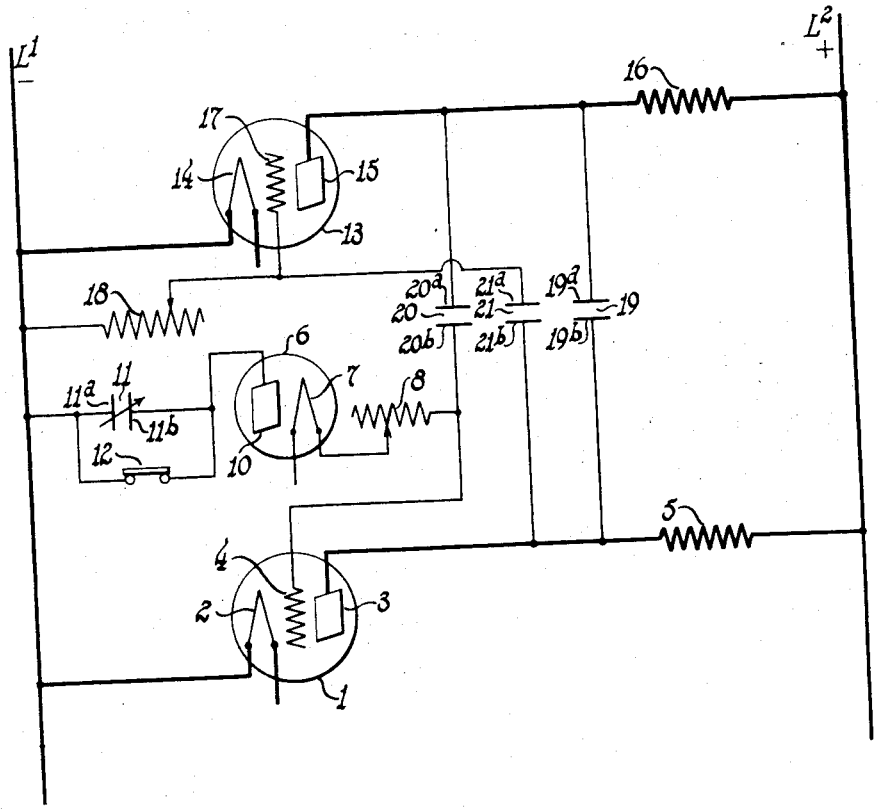
Inventor
Carroll Stansbury
By [signature]
Attorney Patented Apr. 10, 1934

1,954,028

UNITED STATES PATENT OFFICE 1,954,028

CURRENT REGULATING SYSTEM

Carroll Stansbury, Wauwatosa, Wis., assignor to Cutler-Hammer, Inc., Milwaukee, Wis., a corporation of Delaware Application May 31, 1930, Serial No. 457,795

18 Claims. (Cl. 171—312)

This invention relates to a method of and means for controlling the current in an electric circuit.

An object of the invention is to provide for varying in a novel and simple manner the effective current flowing in a circuit.

Another object is to provide for varying at a given rate the effective current flowing in a circuit.

Another object is to provide for progressive variation of the regulating action in a current regulating system, so as to vary the effective current flowing in the circuit regulated thereby.

Another object is to accomplish the desired regulation by electronic means, to thereby eliminate friction, inertia and sparking.

Other objects and advantages will hereinafter appear.

The accompanying drawing illustrates diagrammatically an embodiment of the invention, which may be used for regulating the change of the current in a circuit at a given rate, either from a low to a high value, or, from a high value to a low value, the embodiment illustrated comprising elements and circuits forming part of the showing of Fig. 4 of my Patent No. 1,926,821, September 12, 1933, of which patent the present application is a continuation in part.

In the drawing, $L^1$—$L^2$ are respectively the negative and positive terminals of a supply line. 1 is an electron tube having the cathode 2, an anode 3 and a grid 4. The cathode is connected to the negative line, while the anode is connected through a translating device 5, whose current is to be regulated, to the positive line $L^2$. A second electron tube 6 has its cathode 7 connected through an adjustable impedance 8 to the grid 4, while its anode 10 is connected through a variable condenser 11 of relatively large capacity to the negative line. $11^a$ and $11^b$ are the plates of opposite polarity of the condenser 11. The condenser may be short-circuited by a switch 12, which may be operated in any desired manner. A third electron tube 13 has its cathode 14 connected to the negative line while its anode 15 is connected through an impedance 16 to the positive line. The grid 17 of tube 13 is connected through an adjustable impedance 18 to the negative line. A condenser 19 having plates $19^a$ and $19^b$ of opposite polarity, is connected between the anodes 3 and 15. A second condenser 20 with plates $20^a$ and $20^b$ and of a capacity which is small relative to that of condenser 11, is connected between the anode 15 and the grid 4, while a third condenser 21 having plates $21^a$ and $21^b$ is connected between the anode 3 and the grid 17.

The tubes 1, 6 and 13 may be of the gaseous type with heated cathodes, and the cathodes may be heated in any well known manner. Under certain conditions, however, the tubes 1 and 13 may be of the high vacuum type, and the tube 6 may be replaced by any other type of rectifier.

The controller operates as follows: With the switch 12 closed, so that the condenser 11 is short-circuited and the lines $L^1$ and $L^2$ energized, the potential of the grid 17 with respect to the cathode 14 is such, that current is permitted to pass through the impedance 16 and the tube 13. The potential of the grid 4 with respect to the cathode 2 is also such, that current can pass through the tube 1 and the translating device 5. However, due to the differences in the impedance of the two circuits, and to differences in the voltage necessary to start an arc in the two tubes, it is found that current will start to flow in one circuit before it does in the other circuit. For illustration, suppose that current starts first through tube 1 and translating device 5. It is well known that the voltage necessary to start an arc in tubes of this type is considerably higher than the voltage necessary to maintain an arc once it has started. When current starts through tube 1, the potential of its anode 3 is immediately reduced to the lower value above mentioned and as there is initially no charge on condenser 19 the potential of anode 15 of tube 13 is also reduced to the same value, momentarily preventing the starting of an arc in tube 13.

Condenser 19 immediately starts charging through a path from line $L^2$ through translating device 16, condenser 19, anode 3, cathode 2, to negative line $L^1$. At the same time condenser 20 is charged over a path from line $L^2$ translating device 16, condenser 20, grid 4, cathode 2, to line $L^1$. When 19 has charged sufficiently so that anode 15 (which is common with plate $19^a$) is sufficiently positive to attain a potential which will start an arc in tube 13, the latter starts to conduct and reduces the potential of anode 15 to its arc-maintaining value. As the result, the potential of anode 3 is reduced below the arc-maintaining value by the amount by which the condenser plate $19^b$ is negative with respect to plate $19^a$ and the arc in tube 1 is accordingly extinguished. The condenser 19 immediately begins to discharge from plate $19^a$ over impedance 16, line $L^2$, translating device 5 to plate $19^b$, while the condenser 20 discharges from $20^a$ through tube 13 to line $L^1$, switch 12, tube 6, resistance 8 to plate 20$^b$. The impedance of the tube 6 is relatively small, so that the rate of discharge of the condenser 20 is largely dependent upon the value of impedance 8, and by adjusting such impedance the time which is required for the condenser 20 to discharge so as to reduce the potential of the grid 4 to a suitable value, may be regulated. When the condenser 19 has discharged the anode 3 is again at the potential of the positive line L$^2$ and when after a certain time interval the negative potential on the grid 4 has been reduced to a given critical value, the tube 1 again becomes conducting. When the current suddenly begins to flow through the tube 1, the potentials of the condenser plates 19$^b$ and 21$^b$ are lowered as aforedescribed, and as a result the potentials of plates 19$^a$ and 21$^a$ are also lowered to a value, which will stop the flow of current through tube 13 and the impedance 16. The condenser 19 immediately discharges again over the discharge path described above, while the condenser 21$^a$ discharges over a path consisting of the tube 1 and the impedance 18, the rate of discharge depending upon the value of impedance 18. When the condenser 21 has discharged to a sufficiently low potential the tube 13 again becomes conducting, thereby affecting the anode 3 and grid 4 in the manner aforedescribed, so as to stop flow through tube 1 and the aforedescribed cycle is repeated.

Thus the current supplied to the translating device 5 varies between maximum and zero, the effective value depending on the relative intervals during which current flows through the translating device and is stopped from flowing. These intervals may be regulated by varying the impedances 8 and 18 and the condensers 20 and 21.

If it is desired to vary the effective current of the translating device 5 gradually to a lower value, the switch 12 is opened. If now at the moment when current starts through the tube 13 the plate 20$^b$ becomes highly negative, it sends a negative charging current through impedance 8 and tube 6 to the condenser plate 11$^b$, and as a result the latter acquires a small negative potential, the value of which depends upon the maximum potential of the plate 20$^b$ and the relative capacities of the condensers 20 and 11. Due to the fact that the tube 6 is conducting and permits electrons to flow only in one direction, namely from the cathode to the anode, the negative electrons, which by discharge of the condenser 20 have been accumulated on the plate 11$^b$, cannot return during the succeeding interval and therefore a counter electromotive force due to the charge on the condenser plate 11$^b$ opposes the discharge of the condenser 20. During the succeeding discharge period the condenser 20 again effects accumulation of an additional amount of electrons on the condenser plate 11$^b$. As the condenser 11 has already a charge, the discharge of the condenser 20 in opposition to the charge of the condenser 11 will require a slightly longer time interval, so that the restoration of the conduction period of tube 1 and hence the restoration of current flow through the translating device 5 is delayed for a longer period, than during the first cycle. During each successive cycle the counter voltage of the condenser 11 increases due to its increasing charge, and thus the discharge of the condenser 20 to the critical value at which tube 1 conducts is delayed more and more until finally the counter electromotive force of the condenser 11 prevents the discharge of condenser 20 from attaining such critical value, whereby the grid 4 is maintained at a highly negative value to prevent any further current flow through the tube 1 and the translating device 5.

The time which is required for the condenser 11 to acquire the aforementioned critical potential depends upon the relative capacities of the two condensers, and by adjusting the condenser 11 it is possible to determine the number of cycles which are required, before the tube 1 is rendered continually non-conducting. The length of the individual cycle during which the tube 1 is rendered non-conducting may be adjusted by adjustment of the impedance 8.

It will thus be seen, that it is possible to vary the effective current passing through the translating device 5 at an adjustable rate, by adjustment of the condenser 11 and the impedance 8.

It will also be noted, that the current through the translating device 5 varies between a maximum and zero value. If it is desired to have the minimum value higher than zero it is possible to accomplish this in various ways as for example by paralleling the tube 1 by an impedance such as indicated in Fig. 4 of my copending application above mentioned.

The system illustrated in the drawing may also be employed to vary the current supplied to a translating device from a minimum value to a maximum value in a given time. In this case the translating device through which the current is to be regulated, takes the place of the impedance 16 in the system described before, while the translating device 5 is replaced by an impedance. From the description of the preceding system it is clear, that during the periods when the tube 1 is conducting, the tube 13, and the translating device connected in series therewith, carry no current and vice versa. It is thus possible, by connecting the translating device in series with the tube 13, to vary its effective current from a relatively low value to a relatively high value by adjustment of the condenser 11 and the impedance 8. In this case also it is possible to increase the minimum current flowing through the translating device during the periods when the tube 13 is non-conducting, by paralleling the latter with an impedance.

The systems herein described may be employed in a manner similar to the system illustrated in Fig. 4 of my aforementioned patent, for the regulation of the field of a motor, or, for the regulation of the current in any other suitable translating device.

Other modifications besides those described herein and obvious to one skilled in the art may be made, without departing from the spirit and scope of the invention as disclosed and claimed in the appended claims.

What I claim as novel and desire to protect by Letters Patent is:

1. The method of varying the effective current passed by an electronic tube in a system providing for stopping of the discharge of the tube periodically and restarting of the discharge under the control of a grid, which consists in gradually storing energy of the system within an interval during which the tube discharges successively, to provide a potential increasing with successive discharges of the tube, and impressing upon the grid the progressive values of such potential.

2. The method of controlling the rate of change of the effective current passed by an electron tube in a system providing for stopping of the current flow of varying the potential impressed upon said tube and delaying restarting of the flow by an electric field, which consists in subjecting said field to the voltage of an energy storage circuit, and impressing said varying potential upon said storage circuit.

3. The method of controlling the rate of change of the effective current passed by a vapor discharge path in a system providing for stopping of the current flow by periodically impressing a transient potential upon said path and delaying restarting of the flow by subjecting said path to the influence of an electric field, which consists in subjecting said field to the voltage of an energy storage circuit, and impressing said transient potential upon said storage circuit.

4. The method of controlling the rate of change of the effective current passed by a vapor discharge path in a system providing for stopping of the current flow by periodically impressing a transient potential upon said path and delaying restarting of the flow by subjecting said path to the influence of an electric field produced by transient effects of an energy storage circuit, which consists in subjecting said field to the voltage of a second energy storage circuit, said second circuit being also subjected to said transient effects.

5. In a circuit, an electron tube, having an anode and grid, means to vary the voltage impressed upon said anode to stop the discharge current, means to impress a transient potential upon said grid to prevent restarting of the current, and a unidirectional energy storage discharge circuit associated with said grid, to control the rate of discharge of said transient potential.

6. In a direct current circuit, a unidirectional gaseous discharge tube having an anode and grid, means to impress transient potentials upon said anode and grid to stop the discharge current of the tube and delay restarting and a unidirectional energy storage discharge circuit associated with said grid to control the rate of discharge of the transient potential on the grid.

7. In a circuit, a unidirectional gaseous discharge tube having an anode and grid, means to vary the potential upon said anode to stop the discharge current, means to impress a transient potential upon said grid to prevent restarting of the discharge current, and a unidirectional energy storage discharge circuit associated with said grid to control the rate of discharge of the transient potential of the grid.

8. In a direct current circuit, a unidirectional gaseous discharge tube having an anode and grid, means to impress transient potentials upon said anode and grid to stop the discharge current of the tube and delay restarting and a unidirectional, adjustable energy storage circuit for retarding the discharge of the transient potential on said grid, whereby the rate of discharge of the transient potential impressed upon the grid may be regulated.

9. In a direct current circuit, a unidirectional gaseous discharge tube having an anode and grid, means to impress transient potentials on said anode and grid to stop the flow of current through the tube and delay restarting and energy storage means and a rectifier to maintain the transient potential on said grid for a variable interval, to thereby maintain the tube in a non-conducting condition for a variable period.

10. In a direct current circuit, a unidirectional gaseous discharge tube having an anode and grid, means to impress a transient potential upon said anode to temporarily stop the flow of current through the tube, means to impress a transient potential upon the grid and means to maintain said latter transient potential for an interval and to store up the energy due to its discharge, to thereby maintain the tube in a non-conducting condition for a variable period.

11. In a direct current circuit a unidirectional gaseous discharge tube having an anode and grid, means to impress transient potentials upon said anode and grid to stop the flow of current through the tube and delay restarting, and an adjustable unidirectional energy storage circuit, which retards the discharge of the transient potential on said grid, whereby the time interval during which the grid maintains the tube non-conducting is gradually varied with successive cycles.

12. In a direct current circuit, a unidirectional gaseous tube having an anode and grid, means to impress a transient potential upon said anode to stop the flow of current through the tube, additional means to impress a transient potential upon the grid to thereby maintain the tube non-conducting pending discharge of the transient potential of the grid, and an adjustable unidirectional energy storage circuit, which retards the discharge of the transient potential on said grid, whereby the time interval during which the grid maintains the tube non-conducting is gradually varied with successive cycles.

13. In combination, a current supply, a translating device, a gaseous discharge tube in circuit with the translating device and the supply and having an anode and grid, means to vary the potential on said anode to stop the flow of current through said tube, means to impress a transient potential on said grid to prevent restarting of the current flow, and an adjustable unidirectional energy storage circuit, which retards the discharge of the transient potential on said grid, whereby the time interval during which the grid maintains the tube non-conducting is varied gradually with successive cycles.

14. In combination, a direct current supply, a translating device, a gaseous discharge tube in circuit with said translating device and said supply and having an anode and grid, means to impress transient potentials on said anode and grid to stop the flow of current through said tube and said translating device and delay restarting, and an adjustable unidirectional energy storage circuit, which retards the discharge of the transient potential on said grid, whereby the fraction of the cycle during which the grid maintains the tube non-conducting is gradually varied with successive cycles.

15. In combination, a direct current supply, a translating device, a gaseous discharge tube having an anode and grid, a second tube normally non-conducting, means to render said second tube conducting to thereby produce transient potentials on said anode and grid to stop the flow of current through the first tube and delay restarting, and an adjustable unidirectional energy storage circuit which retards the discharge of the transient potential on said grid, whereby the fraction of the cycle during which the grid maintains the tube non-conducting is gradually varied with successive cycles.

16. In combination, a direct current supply, a translating device, a gaseous discharge tube in circuit with said translating device and said supply and having an anode and grid, a second tube having an anode and grid, means associated with each tube to produce transient potentials upon the anode and grid of the other tube to stop the flow of current therethrough and delay restarting, and adjustable energy storage circuits, which retard the discharge of the transient potential on said grids, whereby the time intervals during which the grids maintain their respective tubes non-conducting may be regulated, one of said last mentioned circuits containing unidirectional energy storage means, adapted to maintain its transient potential for intervals varying with successive cycles of operation.

17. In combination, a direct current supply, a translating device, a gaseous discharge tube in circuit with said translating device and said supply and having an anode and grid, a second tube having an anode and grid, energy storage means associated with each tube and capable of producing transient potentials upon the anode and grid of the other tube to stop the flow of current therethrough and delay restarting, discharge circuits associated with said grids for controlling the rate of discharge of the transient potentials thereon, at least one of said discharge circuits containing a condenser and a rectifier for storing up the discharge energy, whereby the time interval during which the latter discharge circuit maintains its respective tube non-conducting is varied with successive cycles.

18. In combination, a direct current supply, a translating device, a gaseous discharge tube in circuit with said translating device and said supply and having an anode and grid, a second tube having an anode and grid, energy storage means associated with each tube and capable of producing transient potentials upon the anode and grid of the other tube to stop the flow of current therethrough and delay restarting, discharge circuits associated with said grids for controlling the rate of discharge of the transient potentials thereon, at least one of said discharge circuits containing a condenser and a rectifier for storing up the discharge energy whereby the time interval during which the latter discharge circuit maintains its respective tube non-conducting is varied with successive cycles, and means to modify the effect of said condenser upon the grid to which it is connected.

CARROLL STANSBURY.